(12) United States Patent
Shimono et al.

(10) Patent No.: US 10,534,766 B2
(45) Date of Patent: Jan. 14, 2020

(54) DATA MANAGEMENT APPARATUS AND DATA MANAGEMENT METHOD

(71) Applicant: FUJITSU LIMITED, Kawasaki-shi, Kanagawa (JP)

(72) Inventors: Akio Shimono, Yokohama (JP); Naoki Miyoshi, Machida (JP); Kazutoshi Fujishima, Hamamatsu (JP); Akira Otsuka, Shizuoka (JP)

(73) Assignee: FUJITSU LIMITED, Kawasaki (JP)

( * ) Notice: Subject to any disclaimer, the term of this patent is extended or adjusted under 35 U.S.C. 154(b) by 87 days.

(21) Appl. No.: 14/317,366

(22) Filed: Jun. 27, 2014

(65) Prior Publication Data
US 2015/0026221 A1 Jan. 22, 2015

(30) Foreign Application Priority Data
Jul. 19, 2013 (JP) .................................. 2013-150946

(51) Int. Cl.
G06F 17/30 (2006.01)
G06F 16/23 (2019.01)
G06F 16/21 (2019.01)

(52) U.S. Cl.
CPC ............ *G06F 16/23* (2019.01); *G06F 16/211* (2019.01)

(58) Field of Classification Search
CPC ......... G06F 17/30345; G06F 17/30292; G06F 17/30371
See application file for complete search history.

(56) References Cited

U.S. PATENT DOCUMENTS

| 5,317,742 | A  | * | 5/1994 | Bapat | G06F 17/30595 |
| | | | | | 707/714 |
| 5,838,965 | A  | * | 11/1998 | Kavanagh | G06F 9/4448 |
| 7,031,956 | B1 | * | 4/2006 | Lee | G06F 17/30595 |
| 7,280,996 | B2 | * | 10/2007 | Hayakawa | G06F 17/30578 |
| | | | | | 707/621 |
| 7,620,630 | B2 | * | 11/2009 | Lloyd | G06F 17/30067 |
| 8,458,176 | B2 | * | 6/2013 | Harvey | G06F 17/30575 |
| | | | | | 707/731 |
| 8,775,374 | B2 | * | 7/2014 | Araki | G06F 17/30575 |
| | | | | | 707/613 |
| 9,507,820 | B1 | * | 11/2016 | Hannah | G06F 17/30424 |
| 2003/0154187 | A1 | * | 8/2003 | Hayakawa | G06F 17/30578 |

(Continued)

FOREIGN PATENT DOCUMENTS

JP 2006-107466 4/2006

OTHER PUBLICATIONS

Chinese Office Action dated Jan. 25, 2017 in corresponding Chinese Patent Application No. 201410294768.4.

*Primary Examiner* — Hung Q Pham
(74) *Attorney, Agent, or Firm* — Staas & Halsey LLP

(57) ABSTRACT

A data management apparatus manages a database that has a plurality of items each of which has item attribute data. The data management apparatus includes determining, when an update request to the database is accepted, whether an item that is designated in the update request is included in the items, adding, when the designated item is not included in the items, the designated item to the items, and setting a definition setting flag included in item attribute data of the designated item to a second state that is different from a first state to which a definition setting flag included in item attribute data of an item approved as an item of the database is set.

3 Claims, 7 Drawing Sheets

(56) References Cited

U.S. PATENT DOCUMENTS

| | | | |
|---|---|---|---|
| 2003/0167286 A1* | 9/2003 | Yasuta | G06F 17/30575 |
| 2004/0019879 A1* | 1/2004 | Segawa | G06F 17/2211 |
| | | | 717/124 |
| 2004/0194069 A1* | 9/2004 | Surasinghe | G06F 8/30 |
| | | | 717/136 |
| 2005/0102297 A1* | 5/2005 | Lloyd | G06F 17/30067 |
| 2005/0256740 A1* | 11/2005 | Kohan | G06F 19/322 |
| | | | 705/2 |
| 2006/0075396 A1* | 4/2006 | Surasinghe | G06F 8/70 |
| | | | 717/168 |
| 2006/0230019 A1* | 10/2006 | Hill | G06F 17/30404 |
| 2006/0288021 A1* | 12/2006 | Kojima | G06F 17/2205 |
| 2007/0106699 A1* | 5/2007 | Harvey | H04L 29/12132 |
| 2007/0112789 A1* | 5/2007 | Harvey | G06F 17/30575 |
| 2010/0083092 A1* | 4/2010 | Schuller | G06F 17/246 |
| | | | 715/227 |
| 2010/0121839 A1* | 5/2010 | Meyer | G06F 17/30893 |
| | | | 707/720 |
| 2010/0250599 A1* | 9/2010 | Schmidt | G06F 17/30241 |
| | | | 707/780 |
| 2012/0109903 A1* | 5/2012 | Freedman | G06F 17/3023 |
| | | | 707/690 |
| 2013/0110787 A1* | 5/2013 | Garimella | G06F 17/30235 |
| | | | 707/667 |
| 2013/0191326 A1* | 7/2013 | Sharma | G06F 17/30289 |
| | | | 707/608 |
| 2014/0304263 A1* | 10/2014 | Vaitheeswaran | G06F 17/30598 |
| | | | 707/737 |
| 2015/0088924 A1* | 3/2015 | Abadi | G06F 17/30979 |
| | | | 707/769 |

* cited by examiner

FIG.2A

| | ATTRIBUTE | PK | TABLE NAME |
|---|---|---|---|
| 221a | TABLE ID | O | UNIQUE ID FOR MANAGEMENT |
| 221b | TABLE NAME | | NAME OF TABLE |

FIG.2B

| 221a | 221b |
|---|---|
| TABLE ID | TABLE NAME |
| 1 | PRODUCT |
| 2 | ORDER |

FIG.3A

| ATTRIBUTE | PK | VALUE |
|---|---|---|
| 222a — TABLE ID | O | TABLE DEFINITION ID |
| 222b — ATTRIBUTE ID | O | UNIQUE ID FOR MANAGEMENT IN TABLE |
| 222c — ATTRIBUTE NAME | | NAME OF ATTRIBUTE |
| 222d — ATTRIBUTE TYPE | | TYPE OF ATTRIBUTE |
| 222e — DECLARATION FLAG | | TRUE/FALSE VALUE INDICATING WHETHER ATTRIBUTE HAS BEEN DECLARED |

FIG.3B

| TABLE ID (222a) | ATTRIBUTE ID (222b) | ATTRIBUTE NAME (222c) | ATTRIBUTE TYPE (222d) | DECLARATION FLAG (222e) |
|---|---|---|---|---|
| 1 | 1 | PRODUCT ID | NUMERAL | TRUE |
| 1 | 2 | PRODUCT NAME | CHARACTER STRING | TRUE |
| 1 | 3 | PRICE | NUMERAL | TRUE |
| 1 | 4 | DEPARTMENT CODE | NUMERAL | FALSE |
| 2 | 1 | ORDER ID | NUMERAL | TRUE |
| 2 | 2 | CUSTOMER | CHARACTER STRING | TRUE |

…

DATA MANAGEMENT APPARATUS AND DATA MANAGEMENT METHOD

CROSS-REFERENCE TO RELATED APPLICATION

This application is based upon and claims the benefit of priority of the prior Japanese Patent Application No. 2013-150946, filed on Jul. 19, 2013, the entire contents of which are incorporated herein by reference.

FIELD

The embodiment discussed herein is related to a data management program, and the like.

BACKGROUND

Among databases (DB), there is a DB (for example, schema-full DB) that operates under conditions having schemas in which an item name and a data type have been defined in advance for each item of the DB. Moreover, there is a DB (for example, schemaless DB) that operates under conditions having no schemas. Furthermore, there is a DB (for example, hybrid DB) that operates under conditions in which a schema-full DB and a schemaless DB both exit. Specifically, in the hybrid DB, while common attributes that are given to items that structure a table are defined in a schema, attributes of some items are defined ad hoc in a schema.

For the hybrid DB, a technique of extending a schema when multiple database sources are merged has been disclosed (for example, Japanese Laid-open Patent Publication No. 2006-107466). For example, when a predetermined application merges multiple data sources, fields in each data source are mapped. Specifically, the first data source is extracted as the initial data source, fields of each data source subsequent to the extracted data source are associated with fields of the initial data source, and fields in the subsequent data sources that are not included in the initial data source are added. The fields mapped from each input data source are added ad hoc in the schema.

However, in the technique of extending a schema, there is a problem that when an unintended item is added to a schema, the unintended item is not identified. That is, an item that is added to the schema by schema extension is added without checking the item name, the data type, and the like. Accordingly, an unintended item can be added, for example, by making a spelling mistake in an item name. Therefore, in a conventional predetermined application, it is impossible to determine whether an added item is an intended item or an unintended item.

SUMMARY

According to an aspect of an embodiment, a non-transitory computer-readable recording medium stores a data management program. The program causes a computer to execute a process. The process includes determining, when an update request to a database is accepted, the database having a plurality of items each of which has item attribute data, whether an item that is designated in the update request is included in the items. The process includes adding, when the designated item is not included in the items, the designated item to the items. The process includes setting a definition setting flag included in the item attribute data of the designated item to a second state that is different from a first state to which a definition setting flag included in the item attribute data of an item approved as an item of the database is set.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2A is a diagram illustrating an example of a data configuration of a table definition according to the embodiment;

FIG. 2B is a diagram illustrating an example of the table definition according to the embodiment;

FIG. 3A is a diagram illustrating an example of a data configuration of an attribute definition according to the embodiment;

FIG. 3B is a diagram illustrating an example of the attribute definition according to the embodiment;

DESCRIPTION OF EMBODIMENT(S)

Preferred embodiments of the present invention will be explained with reference to accompanying drawings. The present invention is not limited to the embodiment.

Configuration of Data Management Apparatus

Figure 1:
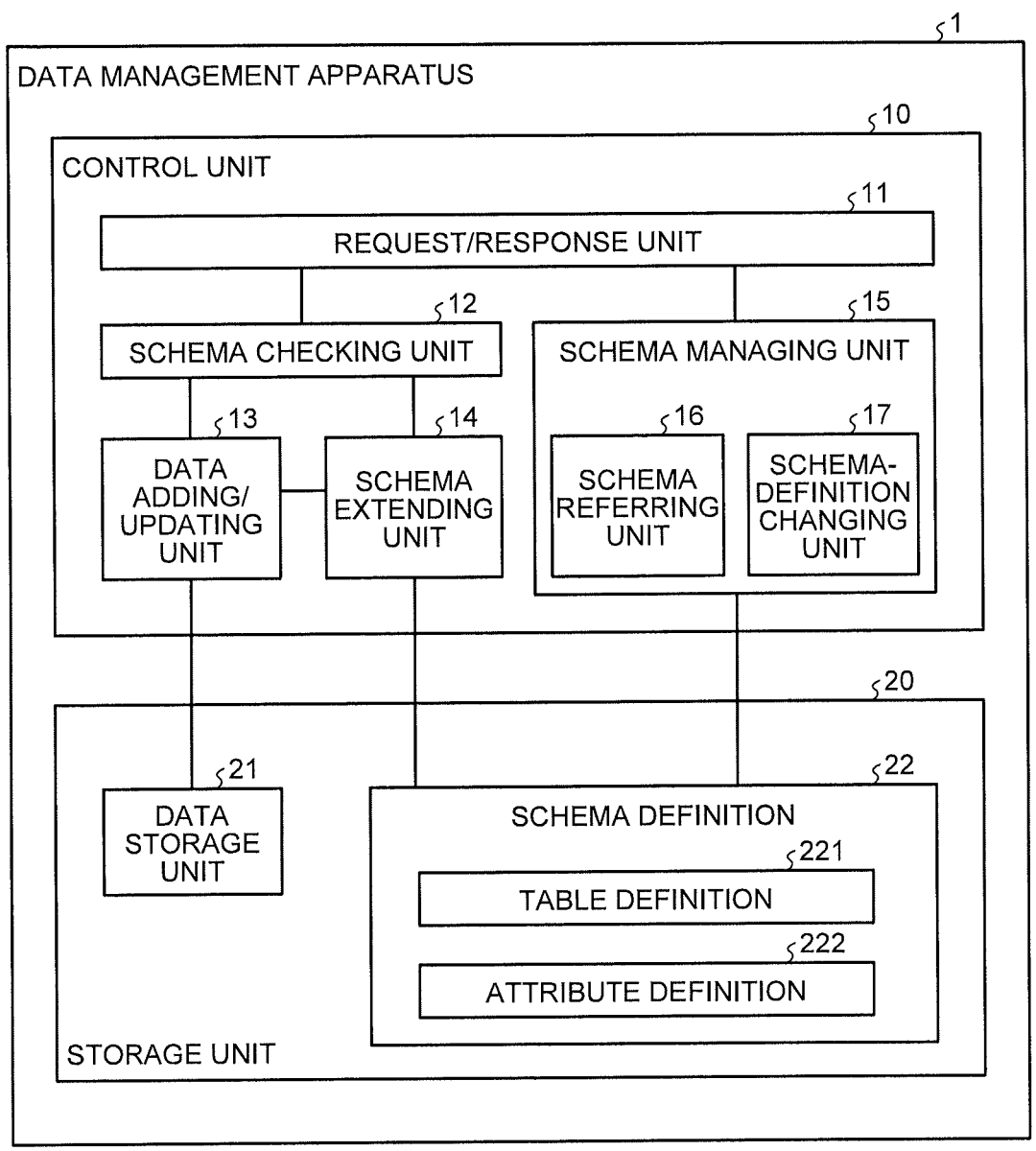
FIG. 1 is a block diagram of a data management apparatus according to an embodiment.

FIG. 1 is a block diagram of a data management apparatus according to the embodiment. As illustrated in FIG. 1, a data management apparatus 1 includes a control unit 10 and a storage unit 20. The data management apparatus 1 manages a database. When data is to be added to an item that has not been defined in the database, besides adding the item that has not been defined to a schema, the data management apparatus 1 sets a declaration flag that is newly given to the schema to identification data (for example, "false") indicating an undeclared (undefined) item, thereby performing schema extension. On the other hand, for an item that has already been defined in the schema, a declaration flag thereof is set to identification data (for example, "true") indicating a declared (defined) item. Suppose, in the embodiment, the database (DB) is a hybrid DB that operates under conditions that a schema-full DB having schemas and a schemaless DB having no schemas are both present. That is, in the database according to the embodiment, while common attributes that are supposed to be given to items that structure a table are defined in a schema, attributes of some items are defined ad hoc in a schema. The declaration flag is an example of a definition setting flag.

The control unit 10 includes an internal memory to store a program and control data in which various kinds of processing procedures are determined, and performs various kinds of processing based thereon. The control unit 10 corresponds to an electronic circuit of an integrated circuit such as an application specific integrated circuit (ASIC) and a field programmable gate array (FPGA). Moreover, the control unit 10 corresponds to an electronic circuit such as a central processing unit (CPU) and a micro processing unit (MPU). Furthermore, the control unit 10 includes a request/response unit 11, a schema checking unit 12, a data adding/updating unit 13, a schema extending unit 14, and a schema managing unit 15. The schema managing unit 15 includes a schema referring unit 16 and a schema-definition changing unit 17.

The storage unit 20 corresponds to, for example, a storage device as a nonvolatile semiconductor memory device such as a flash memory and a ferroelectric random-access memory (FRAM). Moreover, the storage unit 20 may also corresponds to, for example, a storage device applying a volatile semiconductor memory device such as a random access memory (RAM). In this case, the storage unit 20 may be configured to download data from a storage device such as a nonvolatile semiconductor memory device. The storage unit 20 includes a data storage unit 21 and a schema definition 22. The data storage unit 21 stores data stored based on each attribute of one or more items. For example, multiple tables are stored in the data storage unit 21, and in each of the tables, a value (data) is stored for each of one or more items defined by the schema definition 22 described later. The schema definition 22 each attribute of the items. The schema definition 22 includes a table definition 221 and an attribute definition 222.

A data configuration of the table definition 221 is explained referring to FIG. 2A and FIG. 2B. FIG. 2A is a diagram illustrating an example of the data configuration of the table definition according to the embodiment. FIG. 2B is a diagram illustrating an example of the table definition according to the embodiment.

As illustrated in FIG. 2A, the table definition 221 includes a table identification (ID) 221a and a table name 221b as attributes. The table ID 221a is a unique ID that is used for table management. In this example, it is indicated that the table ID 221a is a primary key. The table name 221b is a name of a table.

As illustrated in FIG. 2B, the table definition 221 stores the table name 221b associating with the table ID 221a. As an example, when the table ID 221a is "1", "product" is stored as the table name 221b. When the table ID 221a is "2", "order" is stored as the table name 221b.

Furthermore, a data configuration of the attribute definition 222 is explained referring to FIG. 3A and FIG. 3B. FIG. 3A is a diagram illustrating an example of a data configuration of an attribute definition according to the embodiment. FIG. 3B is a diagram illustrating an example of the attribute definition according to the embodiment.

As illustrated in FIG. 3A, the attribute definition 222 includes a table ID 222a, an attribute ID 222b, an attribute name 222c, an attribute type 222d, and a declaration flag 222e, as attributes. The table ID 222a is a unique ID that is used for table management. The attribute ID 222b is an ID uniquely indicating an item (attribute name) in a table corresponding to the table ID 222a. The attribute name 222c is a name of an attribute. Note that an attribute name to be set to the attribute name 222c corresponds to an item in a table. The attribute type 222d is a data type of an attribute. For example, when the attribute data is a numeral, "numeral" indicating the type being numeral is set to the attribute type 222d. When the attribute data is a character string, "character string" indicating the type being character string is set to the attribute type 222d. To the attribute type 222d, a "true/false value" indicating true (for example, 0) or false (for example, 1) may be set, if the attribute data is a flag.

The declaration flag 222e is a true/false value indicating whether an attribute has been declared (defined). For example, when an attribute has been declared, "true" indicating that it has been declared is set to the declaration flag 222e. When an attribute has not been declared, "false" indicating that it has not been declared is set to the declaration flag 222e. That is, when an item to which data is to be added has not been defined in the attribute name 222c of the attribute definition 222, besides adding the item to the attribute name 222c of the attribute definition 222, the schema extending unit 14 described later sets the declaration flag 222e to "false", and performs schema extension.

As illustrated in FIG. 3B, the attribute definition 222 stores the table ID 222a, the attribute ID 222b, the attribute name 222c, the attribute type 222d, and the declaration flag 222e, associating with each other. As an example, when the table ID 222a is "1" and the attribute ID 222b is "1", "product ID" is stored as the attribute name 222c, "numeral" is stored as the attribute type 222d, and "true" is stored as the declaration flag 222e. Moreover, when the table ID 222a is "1" and the attribute ID 222b is "4", "department code" is stored as the attribute name 222c, "numeral" is stored as the attribute type 222d, and "false" is stored as the declaration flag 222e. That is, when the item to which data is added is "department code", because "department code" has not been defined in the attribute name 222c of the attribute definition 222, the declaration flag 222e is set to "false". That is, the attribute corresponding to the "department code" is the one for which schema extension has been performed.

Referring back to FIG. 1, the request/response unit 11 accepts a predetermined request to the database, and distributes the accepted request. Moreover, the request/response unit 11 sends a processing result for the request to a requester as a response. The request/response unit 11 may receive a predetermined request from an external device arranged outside the data management apparatus 1, or may receive from another control unit inside the data management apparatus 1.

As an example, when an addition request or an update request to the database is accepted, the request/response unit 11 distributes the accepted request to the schema checking unit 12. At this time, the request/response unit 11 accepts, for example, a request including a table name of a table to which data is added, an item name to which the data is added, and the data, as the addition request. The request/response unit 11 accepts, for example, a request including a table name in which data is updated, an item name in which data is updated, and the data as the update request.

As another example, when a reference request for a schema of the database is accepted, the request/response unit 11 distributes the accepted reference request to the schema referring unit 16. At this time, the request/response unit 11 accepts, for example, a request including a table name of a table desired to be referred and a reference mode, as the reference request. The reference mode herein is a mode that indicates whether to refer to attribute data corresponding to an attribute name for which "false" is set to the declaration flag. A mode indicating that attribute data corresponding to an attribute name for which "false" is set to the declaration flag is not referred is a "normal reference mode". A mode indicating that attribute data corresponding to an attribute name for which "false" is set to the declaration flag is also referred is an "extended reference mode". As an example, when attribute data corresponding to an attribute name for which "false" is set to the declaration flag is also referred, identification data that corresponds to the "extended reference mode" is set as the reference mode. Moreover, the request/response unit 11 sends a reference result to the reference request to a requester as a response.

As another example, when a change request for the declaration flag is accepted, the request/response unit 11 distributes the accepted change request to the schema-definition changing unit 17. At this time, the request/response unit 11 accepts, for example, a request including a table name of a table that has an item corresponding to an attribute name for which the declaration flag is to be changed, the attribute name, and a content of change, as the change request for the declaration flag. To the content of change, "true" is set when changing from "false" to "true", for example.

The schema checking unit 12 performs schema check on an addition request or an update request to the database, based on the schema definition 22. In the following, an example of the schema check performed on an update request is explained. Because the schema check performed on an addition request is similarly performed, the explanation thereof is omitted.

For example, the schema checking unit 12 determines whether an item designated in the update request is included as one among items (attribute names) stored in the attribute definition 222. When determined that the designated item is not included as one among the items (attribute names) stored in the attribute definition 222, the schema checking unit 12 causes the schema extending unit 14 to extend the schema.

Furthermore, when determined that the designated item is included as one among the items (attribute names) stored in the attribute definition 222, the schema checking unit 12 determines whether data of the designated item is not incompatible with the type set in the attribute type 222d based on the attribute definition 222. When determined that the data of the designated item is not incompatible with the type set in the attribute type 222d, the schema checking unit 12 causes the data adding/updating unit 13 to add or update the data. Moreover, when determined that the data of the designated item is incompatible with the type set in the attribute type 222d, the schema extending unit 14 notifies the request/response unit 11 that it is abnormal. Although it has been explained that the schema checking unit 12 determines whether data of an item is incompatible with a type, it is not limited thereto, and the schema checking unit 12 may determine whether there is constraint violation such as the data being not null.

The schema extending unit 14 adds the item designated in the update request to the attribute name 222c of the attribute definition 222. In addition, the schema extending unit 14 sets the declaration flag 222e corresponding to the added attribute name 222c to "false". That is, the schema extending unit 14 sets the declaration flag 222e corresponding to the attribute name 222c added to the attribute definition 222, to "false" indicating that approval has not been made. Furthermore, the schema extending unit 14 sets the attribute type 222d based on the data of the designated item. As an example, when the data of the designated item is "123", the attribute type 222d is set to "numeral". When the data of the designated item is "a-i-u", the attribute type 222d is set to "character string". When the data of the designated item is "TRUE" or "FALSE", the attribute type 222d is set to "true/false value". Thus, the schema extending unit 14 adds the undefined item that is designated in the update request to the attribute definition 222 ad hoc as an undefined item, to extend the schema.

The data adding/updating unit 13 stores the data of the item designated in the update request in the data storage unit 21. Furthermore, the data adding/updating unit 13 stores the data of the item designated in the addition request in the data storage unit 21.

The schema referring unit 16 refers, for a reference request to the schema definition 22 of the database, to contents stored in the attribute definition 222 according to the reference mode included in the reference request. For example, the schema referring unit 16 determines whether the reference mode included in the reference request is the "extended reference mode". When determined that the reference mode is the "extended reference mode", the schema referring unit 16 also refers to attribute data corresponding to attribute names having the declaration flag 222e of the attribute definition 222 being "false" in addition to attribute names having the declaration flag 222e being "true". Moreover, when determined that the reference mode is the "normal reference mode", the schema referring unit 16 refers to attribute data corresponding to attribute names having the declaration flag 222e of the attribute definition 222 being "true". As an example, the attribute data to be referred includes the table ID 222a of the requested table, the attribute ID 222b, the attribute name 222c, the attribute type 222d, and the declaration flag 222e. Thus, the schema referring unit 16 can make a reference about what kind of undefined items that have not been declared are set in the table. Furthermore, the schema referring unit 16 can identify an unintended item by referring to an undefined item that has not been declared.

The schema-definition changing unit 17 changes, for the change request for the declaration flag 222e, a state currently set to a state different from the state currently set according to the change request. For example, the schema-definition changing unit 17 determines whether a content of change indicated in the change request is "true". When determined that the content of change is "true", the schema-definition changing unit 17 changes the declaration flag 222e corresponding to an attribute name of the table stored in the attribute definition 222 from "false" to "true". That is, the schema-definition changing unit 17 changes an undefined item that has not been declared to an item that has been declared. Moreover, when determined that the content of change is "false", the schema-definition changing unit 17 changes the declaration flag 222e corresponding to an attribute name of the table stored in the attribute definition 222 from "true" to "false". That is, the schema-definition changing unit 17 changes an item that has been declared to an undefined item that has not been declared. Thus, the schema-definition changing unit 17 can change an undefined item that has not been declared to an item that has been declared only by manipulating a flag, without changing data in the data storage unit 21.

Flowchart of Processing when Data Addition/Update Request is Accepted

Figure 4:
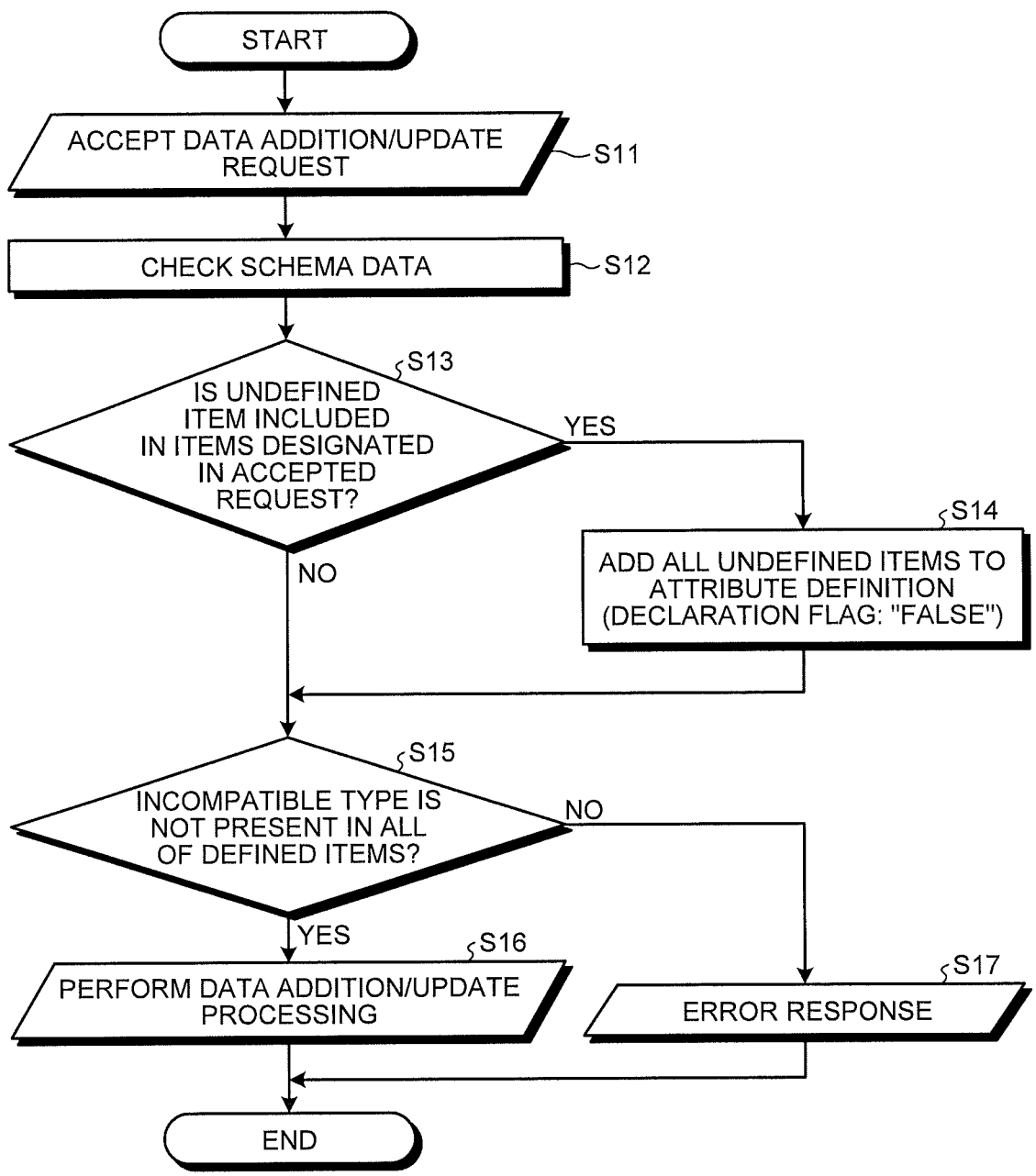
FIG. 4 is a flowchart of processing performed when a data addition/update request is accepted.

Next, referring to FIG. 4, a procedure of processing performed when a data addition/update request is accepted is explained. FIG. 4 is a flowchart of the processing performed when a data addition/update request is accepted. In the example illustrated in FIG. 4, a case in which the request/response unit 11 accepts an update request for data is explained.

As illustrated in FIG. 4, the request/response unit 11 accepts an update request for data (step S11). For example, the request/response unit 11 accepts the update request that includes a table name of a table in which data is to be updated, an item name of an item for which the data is to be updated, and the data. The request/response unit 11 then distributes to the update request to the schema checking unit 12.

The schema checking unit 12 checks schema data for items designated in the update request (step S12), and determines whether an undefined item (attribute) is included in the items (step S13). For example, the schema checking unit 12 determines whether the item designated in the update request is not included in items (attribute names) stored in the attribute definition 222.

When determined that an undefined item is included (step S13: YES), the schema extending unit 14 adds all the undefined items to the attribute definition 222. At this time the schema extending unit 14 sets the declaration flag 222e of the attribute definition 222 to "false" for all of the undefined items (step S14). For example, the schema extending unit 14 adds an item name of an undefined item to the attribute name 222c of the attribute definition 222. In addition, the schema extending unit 14 sets the declaration flag 222e corresponding to the added attribute name 222c to "false". That is, for the added attribute name, "false" representing an undefined attribute that has not been declared is set. Furthermore, the schema extending unit 14 sets the attribute type 222d corresponding to the added attribute name 222c based on data of the undefined item. The schema extending unit 14 then proceeds to step S15.

On the other hand, when determined that no undefined items are included (step S13: NO), the schema checking unit 12 determines, for all of the designated items that have been defined, whether the type of data of an item is not incompatible type based on the attribute definition 222 (step S15). When determined that the types of data of the items are not incompatible type for all of the defined items (step S15: YES), the data adding/updating unit 13 performs data addition/update processing (step S16). That is, the data adding/updating unit 13 stores the data of the item designated in the update request in the data storage unit 21.

On the other hand, when determined that the type of data of the item is incompatible for any one of the defined items (step S15: NO), the schema checking unit 12 notifies the request/response unit 11 of an error to send an error response (step S17).

The schema checking unit 12 may determine, for all of the designated items that have been defined, whether data of an item causes constraint violation. In this case, constraints of attribute is added to the attribute definition 222 in addition to the table ID 222a, the attribute ID 222b, the attribute name 222c, the attribute type 222d, and the declaration flag 222e. The schema checking unit 12 may determine, for all of the designated items that have been defined, whether data of an item does not cause constraint violation.

Flowchart of Processing when Schema Reference Request is Accepted

Figure 5:
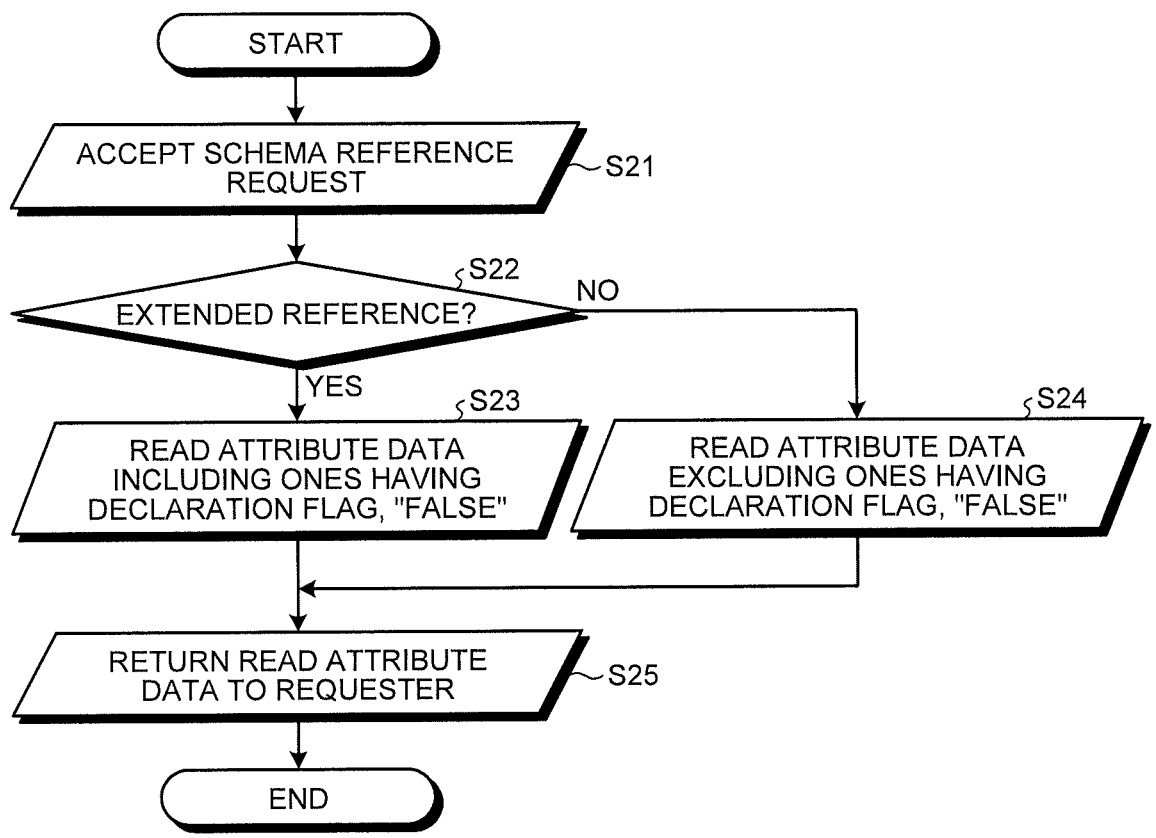
FIG. 5 is a flowchart of processing performed when a schema reference request is accepted.

Next, referring to FIG. 5, a procedure of processing performed when a schema reference request is accepted is explained. FIG. 5 is a flowchart of the processing performed when a schema reference request is accepted.

As illustrated in FIG. 5, the request/response unit 11 accepts a schema reference request (step S21). For example, the request/response unit 11 accepts the schema reference request that includes a table name of a table for which reference is desired, and a reference mode. The request/response unit 11 then distributes to the schema reference request to the schema referring unit 16.

The schema referring unit 16 determines whether the reference mode is the "extended reference mode" indicating extended reference (step S22). When determined that it is the extended reference mode (step S22: YES), the schema referring unit 16 reads attribute data including ones the declaration flag of which is "false", from the attribute definition 222 (step S23). For example, the schema referring unit 16 reads attribute data corresponding to a table designated in the reference request the declaration flag of which is "false" in addition to attribute data the declaration flag of which is "true", from the attribute definition 222. The schema referring unit 16 then proceeds to step S25.

On the other hand, when determined that it is not the extended reference mode (step S22: NO), the schema referring unit 16 reads attribute data excluding ones the declaration flag of which is "false", from the attribute definition 222 (step S24). For example, the schema referring unit 16 reads attribute data corresponding to the table designated in the reference request the declaration flag of which is "true, from the attribute definition 222. The schema referring unit 16 then proceeds to step S25.

At step S25, the schema referring unit 16 sends the read attribute data back to the requester through the request/response unit (step S25). For example, the schema referring unit 16 sends the table ID 222a, the attribute ID 222b, the attribute name 222c, the attribute type 222d, and the declaration flag 222e back to the requester as the attribute data.

Thereafter, at the requester, the received attribute data may be edited, and for example, the attribute name 222c, the attribute type 222d, and the declaration flag 222e may be displayed on a screen. Thus, the requester can identify unintended items even when the unintended items are added to a schema by schema extension.

Flowchart of Processing when Change Request for Declaration Flag is Accepted

Figure 6:
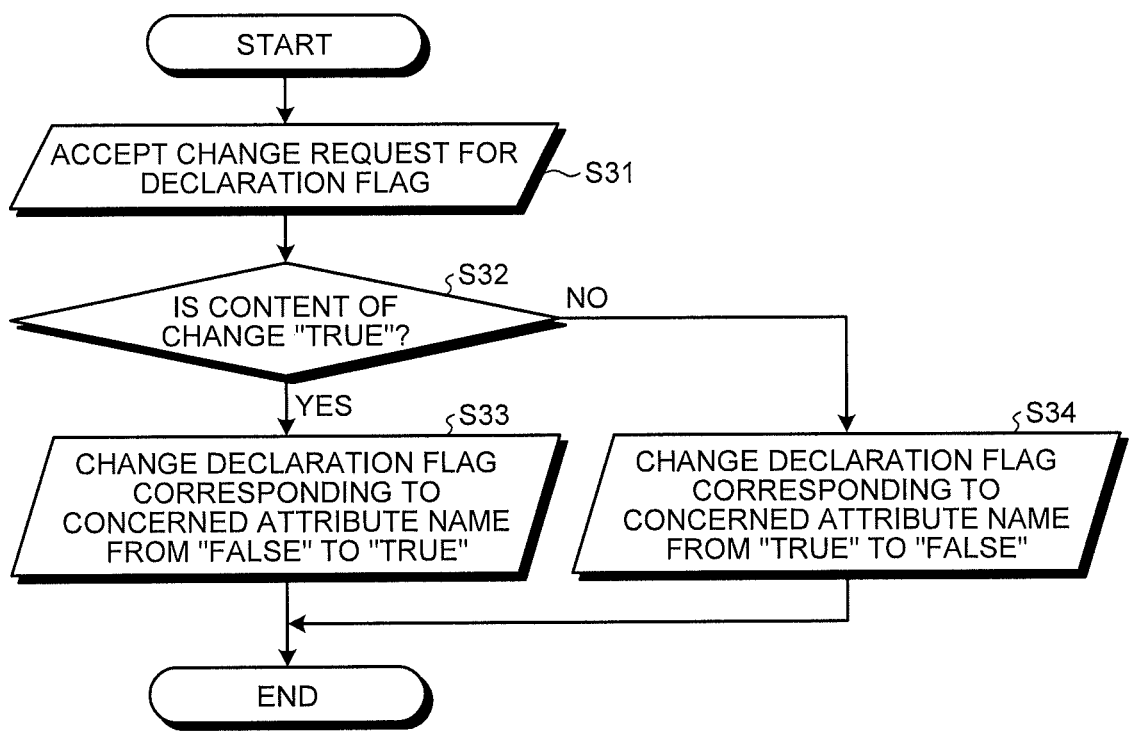
FIG. 6 is a flowchart of processing performed when a change request for a declaration flag is accepted.

Next, referring to FIG. 6, a procedure of processing performed when a change request for the declaration flag is accepted is explained. FIG. 6 is a flowchart of the processing performed when a change request for the declaration flag is accepted.

As illustrated in FIG. 6, the request/response unit 11 accepts a change request for the declaration flag (step S31). For example, the request/response unit 11 accepts the change request that includes a table name of a table having an item corresponding to an attribute name for which the declaration flag is to be changed, the attribute name, and a content of change. The request/response unit 11 then distributes to the change request to the schema-definition changing unit 17.

The schema-definition changing unit 17 determines whether the content of change is "true" (step S32). When determined that the content of change is "true" (step S32: YES), the schema-definition changing unit 17 changes the declaration flag 222e corresponding to the attribute name in the attribute definition 222 from "false" to "true" (step S33). The schema-definition changing unit 17 then ends the processing.

On the other hand, when determined that the content of change is not "true" (step S32: NO), the schema-definition changing unit 17 changes the declaration flag 222e corresponding to the attribute name in the attribute definition 222 from "true" to "false" (step S34). The schema-definition changing unit 17 then ends the processing.

Thus, the schema-definition changing unit 17 can change an undefined item that has not been declared to a defined item, only by manipulating a flag without changing data in the data storage unit 21.

It has been explained that the request/response unit 11 receives a predetermined request from a device externally arranged outside the data management apparatus 1 as an example. In this case, the request/response unit 11 may receive the request from a communication terminal through a network. For example, the request/response unit 11 accepts an update request to a database that has been sent from a communication terminal, and distributes the accepted update request to the schema checking unit 12. Subsequently, when the schema checking unit 12 determines that an item (for example, the department code) designated in the update request is not stored in the attribute definition 222, the schema extending unit 14 adds the item to the attribute name 222c of the attribute definition 222, and sets the declaration flag to "false". Thus, the communication terminal can add a new item to the database as needed. Furthermore, the request/response unit 11 accepts a reference request in the extension reference mode sent from the same communication terminal, and distributes the accepted reference request to the schema referring unit 16. The schema referring unit 16 refers to attribute data corresponding to the items the declaration flags 222e of which are "true" and "false" based on the reference request, and notifies a reference result to the communication terminal of the requester. Thus, the communication terminal can distinguish items of "false" and items of "true" using the reference result, to execute some application programs. The request/response unit 11 further accepts an update request to change the declaration flag 222e of the "department code" sent from the same communication terminal, and distributes the accepted change request to the schema-definition changing unit 17. The schema-definition changing unit 17 then changes the declaration flag 222e of the "department code" from "false" to "true". Thus, the communication terminal can define the "department code" officially, if determined that the "department code" is an available item as a result of executing an application. Moreover, the communication terminal can manage the database remotely.

Effect of Embodiment

According to the embodiment described above, when an update request to a database is accepted, the data management apparatus 1 determines whether an item that is designated in the update request is included as one among items stored in the attribute definition 222. When determined that the designated item is not included as one among the items, the data management apparatus 1 adds the designate item to the attribute definition 222. The data management apparatus 1 then sets the declaration flag 222e included in the attribute definition 222 to a second state that is different from a first state set for the declaration flag 222e corresponding to an item that has been approved as an item of the database. According to such a configuration, even if the designated item is not included in the attribute definition 222, the data management apparatus 1 adds the item to the attribute definition 222 and sets the declaration flag 222e to a state different from that of an approved item, and therefore, it is possible to distinguish the added item from item that have been approved. Consequently, even if a designated item is an unintended item, the data management apparatus 1 can identify the item.

Moreover, according to the embodiment described above, when a reference request to the attribute definition 222 is accepted, the data management apparatus 1 performs the following processing. That is, when it is in the reference mode for referring to items including one the declaration flag 222e of which is in the second state, the data management apparatus 1 outputs item attribute data of the item in the second state in addition to items in the first state. According to such a configuration, even if an update request is made for an unintended item, the data management apparatus 1 can identify the unintended item by referring to the item attribute data of the item in the second state.

Furthermore, according to the embodiment described above, when a change request for the declaration flag 222e of a predetermined item is accepted, the data management apparatus 1 changes a set state to a state different from the set state. According to such a configuration, because the data management apparatus 1 changes the set state according to the change request for the declaration flag 222e of the predetermined item, data associated with the predetermined item can be easily changed according to the changed state. As an example, if the declaration flag 222e of the predetermined item is changed from the second state to the first state, the data management apparatus 1 can easily change the data associated with the predetermined item to approved data. That is, the data management apparatus 1 can change an undeclared item to a declared (approved) item just by manipulating the flag, without changing the data. As another example, if the declaration flag 222e of the predetermined item is changed from the first state to the second state, the data management apparatus 1 can easily change the data associated with the predetermined item to an unapproved data. That is, the data management apparatus 1 can change a declared item to an undeclared item just by manipulating the flag, without changing the data.

Others

The data management apparatus 1 can be implemented by installing respective functions such as the schema checking unit 12, the schema extending unit 14, the schema referring unit 16, and the schema-definition changing unit 17 to a device such as a known personal computer and a workstation.

The respective illustrated configuration elements of the apparatus are not needed to be configured physically as illustrated. That is, a specific form of distribution/integration of the apparatus is not limited to the illustrated one, and all or a part thereof can be distributed/integrated functionally or physically in an arbitrary unit according to various loads, use conditions, or the like. For example, the schema checking unit 12, the data adding/updating unit 13, and the schema extending unit 14 may be integrated as one unit. On the other hand, the request/response unit 11 may be distributed to a request unit and a response unit. The data adding/updating unit 13 may be distributed to a data adding unit and a data updating unit. Moreover, the storage unit 20 may be arranged to be connected through a network, as an external device of the data management apparatus 1.

Figure 7:
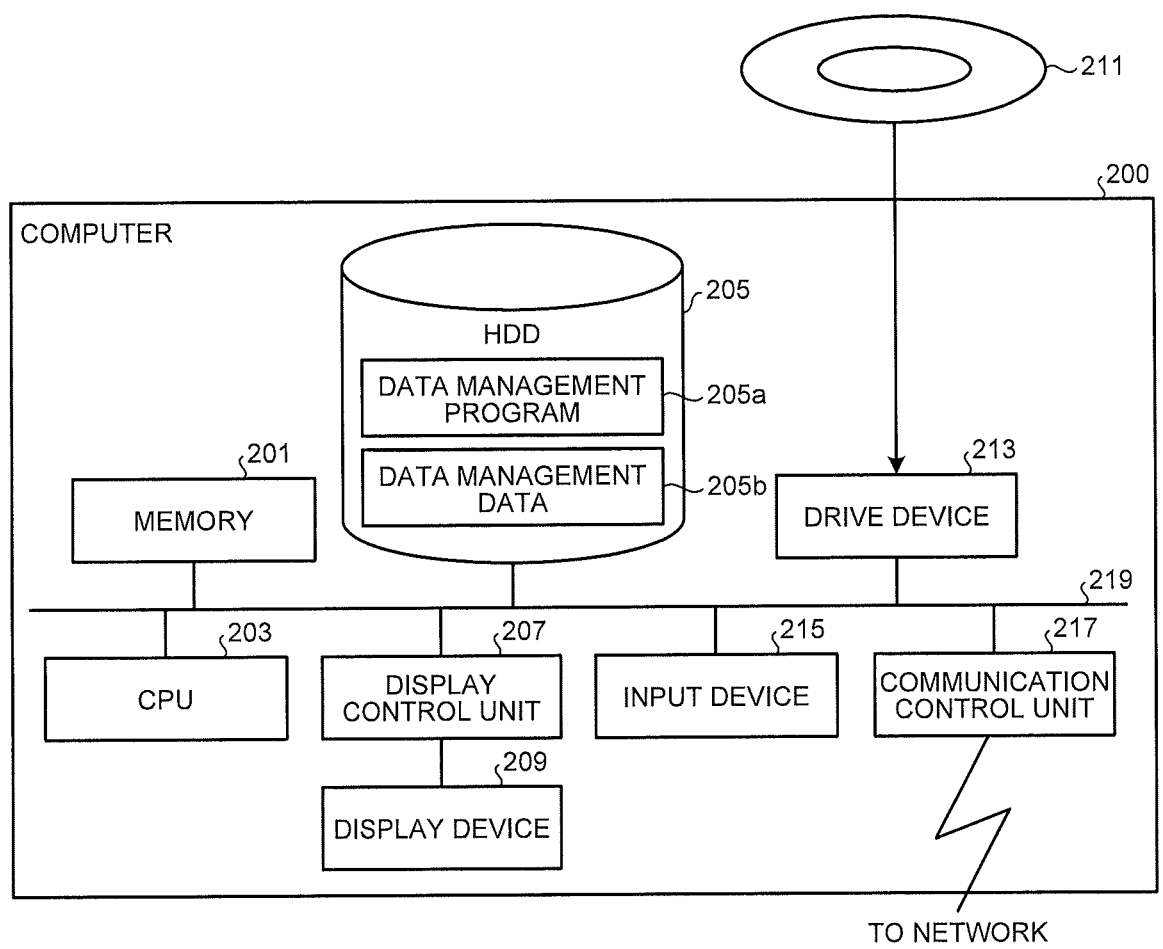
FIG. 7 is a diagram illustrating an example of a computer that executes a data management program.

Furthermore, the various kinds of processing explained in the above embodiment can be implemented by executing a program prepared in advance on a computer such as a personal computer and a workstation. Therefore, an example of a computer that executes a data management program that implements functions similar to the data management apparatus 1 illustrated in FIG. 1 is explained. FIG. 7 is a diagram illustrating an example of a computer that executes the data management program.

As illustrated in FIG. 7, a computer 200 includes a CPU 203 that executes various kinds of arithmetic processing, an input device 215 that accepts data input by a user, and a display control unit 207 that controls a display device 209. Moreover, the computer 200 includes a drive device 213 that reads a program and the like from a recording medium, and a communication control unit 217 that communicates data with other computers through a network. Furthermore, the computer 200 includes a memory 201 that temporarily stores various kinds of data, and a hard disk drive (HDD) 205. The memory 201, the CPU 203, the HDD 205, the display control unit 207, the drive device 213, the input device 215, and the communication control unit 217 are connected through a bus 219.

The drive device 213 is a device for a removable disk 211, for example. The HDD 205 stores a data management program 205a and a data management data 205b.

The CPU 203 reads the data management program 205a to develop on the memory 201, and executes as processes. The processes correspond to the various functions of the data management apparatus 1. The data management data 205b corresponds to the data storage unit 21 and the schema definition 22. The removable disk 211 stores various kinds of data such as the data management program 205a, for example.

The data management program 205a is not needed to be stored in the HDD 205 from the beginning. For example, the program is stored in a "portable physical medium" such as a flexible disk (FD), a compact-disc read-only memory (CD-ROM), a digital versatile disc (DVD), a magneto optical disk, and an integrated circuit (IC) card. It can be configured such that the computer 200 reads the data management program 205a therefrom to execute the program.

According to one aspect, it is possible to identify an unintended item even when the unintended item is added to a schema by schema extension.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable recording medium storing therein a data management program that causes a computer to execute a process comprising:
   determining, in response to a request to add or update data of an item to a database is accepted, whether a name of the item designated in the request is included in the schema, wherein the database stores data table and schema that defines names of a plurality of items of the data table and a definition setting flag for each of the plurality of items, wherein the data table includes data for each of the plurality of items, wherein a first state of the definition setting flag indicates that corresponding items associated with the definition setting flag in the first state are defined and approved as items of the database, wherein a second state of the definition setting flag indicates that corresponding items associated with the definition setting flag in the second state are not defined and not approved as items of the database;
   adding, in response to determining that the name of the item designated in the request is not included in the schema, the data to the data table as a new item and the name of the item designated in the request to the schema, or updating, in response to determining that the name of the item designated in the request is included in the schema, an item in the data table corresponding to the name of the item designated in the request with the data designated in the request;
   setting corresponding definition setting flag for the new item to the second state, wherein corresponding definition setting flag for the updated item that has been set to the first state is unchanged;
   outputting, in response to a reference request to the schema of the database is accepted, items associated with definition setting flags in the first state, wherein the reference request is in a reference mode for referring to items having definition setting flags which are set to the first state, and outputting items associated with definition setting flags in the second state in addition to output items in the first state if the reference request is in extended reference mode; and
   changing, in response to a change request to change a definition setting flag for an item is accepted, the first state, which has been set, to the second state for the item designated in the change request, or the second state, which has been set for the item designated in the change request, to the first state.

2. A data management apparatus comprising:
   circuitry; and
   a memory storing a database that stores data table and schema that defines names of a plurality of items of the data table and a definition setting flag for each of the plurality of items, wherein the data table includes data for each of the plurality of items, wherein a first state of the definition setting flag indicates that corresponding items associated with the definition setting flag in the first state are defined and approved as items of the database, wherein a second state of the definition setting flag indicates that corresponding items associated with the definition setting flag in the second state are not defined and not approved as items of the database, wherein the circuitry:
   determines, in response to a request to add or update data of an item to the database is accepted, whether a name of the item designated in the request is included in the schema;
   adds, in response to determining that the name of the item designated in the request is not included in the schema, the data to the data table as a new item and the name of the item designated in the request to the schema, or updating, in response to determining that the name of the item designated in the request is included in the schema, an item in the data table corresponding to the name of the item designated in the request with the data designated in the request;
   sets corresponding definition setting flag for the new item to the second state, wherein corresponding definition setting flag for the updated item that has been set to the first state is unchanged;
   outputs, in response to a reference request to the schema of the database is accepted, items associated with definition setting flags in the first state, wherein the reference request is in a reference mode for referring to items having definition setting flags which are set to the first state, and outputting items associated with definition setting flaps in the second state in addition to output items in the first state if the reference request is in extended reference mode; and
   changes, in response to a change request to change a definition setting flag for an item is accepted, the first state, which has been set, to the second state for the item designated in the change request, or the second state, which has been set for the item designated in the change request, to the first state.

3. A data management method performed by a computer, the method comprising:

determining, in response to a request to add or update data of an item to a database is accepted, whether a name of the item designated in the request is included in the schema, wherein the database stores data table and schema that defines names of a plurality of items of the data table and a definition setting flag for each of the plurality of items, wherein the data table includes data for each of the plurality of items, wherein a first state of the definition setting flag indicates that corresponding items associated with the definition setting flag in the first state are defined and approved as items of the database, wherein a second state of the definition setting flag indicates that corresponding items associated with the definition setting flag in the second state are not defined and not approved as items of the database, using circuitry;

adding, in response to determining that the name of the item designated in the request is not included in the schema, the data to the data table as a new item and the name of the item designated in the request to the schema, or updating, in response to determining that the name of the item designated in the request is included in the schema, an item in the data table corresponding to the name of the item designated in the request with the data designated in the request, using the circuitry;

setting corresponding definition setting flag for the new item to the second state, wherein corresponding definition setting flag for the updated item that has been set to the first state is unchanged, using the circuitry;

outputting, in response to a reference request to the schema of the database is accepted, items associated with definition setting flags in the first state, wherein the reference request is in a reference mode for referring to items having definition setting flags which are set to the first state, and outputting items associated with definition setting flags in the second state in addition to output items in the first state if the reference request is in extended reference mode, using the circuitry; and changing, in response to a change request to change a definition setting flag for an item is accepted, the first state, which has been set, to the second state for the item designated in the change request, or the second state, which has been set for the item designated in the change request, to the first state, using the circuitry.

* * * * *